(12) United States Patent
Lee (10) Patent No.: US 10,744,470 B2
(45) Date of Patent: Aug. 18, 2020

(54) COLD BREW COFFEE EXTRACTION DEVICE FOR ADJUSTING SONIC VIBRATION BASED ON SOUND SIGNAL

(71) Applicant: Sang Jun Lee, Gyeonggi-do (KR)

(72) Inventor: Sang Jun Lee, Gyeonggi-do (KR)

(73) Assignee: Sang Jun Lee, Gyeonggi-do (KR)

( * ) Notice: Subject to any disclaimer, the term of this patent is extended or adjusted under 35 U.S.C. 154(b) by 222 days.

(21) Appl. No.: 16/015,851

(22) Filed: Jun. 22, 2018

(65) Prior Publication Data

US 2018/0332996 A1 Nov. 22, 2018

Related U.S. Application Data

(63) Continuation of application No. PCT/KR2018/005566, filed on May 15, 2018.

(30) Foreign Application Priority Data

May 22, 2017 (KR) ........................ 10-2017-0063062

(51) Int. Cl.
*A47J 31/00* (2006.01)
*B01F 11/00* (2006.01)
(Continued)

(52) U.S. Cl.
CPC ............... *B01F 11/02* (2013.01); *A47J 31/00* (2013.01); *B01F 11/0094* (2013.01); *B01F 15/00324* (2013.01); *B01F 11/00* (2013.01)

(58) Field of Classification Search
CPC ....... A47J 31/00; B01F 11/00; B01F 11/0094; B01F 15/00324
(Continued)

(56) References Cited

U.S. PATENT DOCUMENTS 8,397,627 B2 3/2013 Reyhanloo
2010/0008178 A1* 1/2010 Fahrion ............... B01F 11/0266
366/110
(Continued)

FOREIGN PATENT DOCUMENTS

CN 101711646 A 5/2010
CN 106659314 A 5/2017
KR 10-1630262 B1 6/2016

OTHER PUBLICATIONS

Chinese Office Action, dated May 14, 2020 issued for Chinese Patent Application No. 201880000805.2.

*Primary Examiner* — Reginald Alexander
(74) *Attorney, Agent, or Firm* — Harness, Dickey & Pierce, P.L.C.

(57) ABSTRACT

A cold brew coffee extraction device for adjusting the sonic vibration based on the sound signal includes: a current support extended in one direction and configured to apply an alternating current in a tangential direction of an outer peripheral portion; a magnetic vibrator accommodating one end of the current support therein, and configured to generate a magnetic field in a direction of crossing over the current support to be vibrated in a longitudinal direction of the current support due to a change in a polarity of the alternating current; a plate coupled to the magnetic vibrator to transmit the vibration to a fluid including a particulate matter; and a vibration adjustment circuit configured to, in a first mode, adjust the vibration only based on setting information inputted through a user interface, and in a second mode, to adjust the vibration based on the setting information and an external sound source.

11 Claims, 6 Drawing Sheets

(51) Int. Cl.
  *B01F 11/02* (2006.01)
  *B01F 15/00* (2006.01)
(58) Field of Classification Search
  USPC .......................... 99/287; 366/108, 114, 116
  See application file for complete search history.

(56) References Cited

U.S. PATENT DOCUMENTS

2011/0188337 A1* 8/2011 Rathgeber ........... B01L 3/50273
    366/108
2015/0356838 A1* 12/2015 Obana ..................... A63F 13/54
    340/407.1

* cited by examiner

COLD BREW COFFEE EXTRACTION DEVICE FOR ADJUSTING SONIC VIBRATION BASED ON SOUND SIGNAL

CROSS REFERENCE TO RELATED APPLICATIONS

The present application is a continuation of PCT/KR2018/005566 filed May 15, 2018 which claims priority to Korean Patent Application No. 10-2017-0063062 filed May 22, 2017. The entire disclosure of the applications identified in this paragraph are incorporated herein by reference.

FIELD

Embodiments of the present disclosure relate to a cold brew coffee extraction device which adjusts a sonic vibration based on a sound signal, and more particularly, to a cold brew coffee extraction device which adjusts a sonic vibration applied to a vessel containing a coffee aqueous solution.

BACKGROUND

Cold brew coffee refers to coffee that is brewed in cold water or room-temperature water, and is less bitter and has a smooth flavor in comparison with coffee made in traditional methods. Accordingly, the number of people enjoying the cold brew coffee is growing explosively.

The cold brew coffee may be divided into cold brew coffee of a drip extraction type and cold brew coffee of an immersion extraction type according to a brewing method. The cold brew coffee of the drip extraction type is made by dripping cold water over ground coffee using gravity and letting it pass through the coffee, and the cold brew coffee of the immersion extraction type is made by brewing ground coffee in a vessel containing water. However, the cold brew coffee made in any extraction method has disadvantages that long time is required to brew and it is difficult to sell for commercial purpose.

As a solution to the above-described problems of the cold brew coffee, a registered patent of an earlier application (Korean Patent Registration No. 10-1630262), filed by the inventors of the present application, suggested an immersion extraction type cold brew coffee extraction device.

However, the registered patent of the earlier application still has a problem to be solved from the aspects of time and emotion by considering the coffee culture of busy modern people.

SUMMARY

Technical Objects

A technical object to be achieved by the present disclosure is to provide a cold brew coffee extraction device for adjusting a sonic vibration based on a sound signal, which adjusts a sonic vibration applied to a vessel containing a coffee aqueous solution, thereby enhancing a coffee extraction effect from the aspects of time and emotion by considering the coffee culture of modern people.

Technical Solving Means

According to an embodiment of the present disclosure, a cold brew coffee extraction device for adjusting a sonic vibration based on a sound signal includes: a current support configured to generate an electric field;

a magnetic vibrator configured to generate a magnetic field, and to be vibrated by the electric field generated by the current support due to a change in a polarity of an alternating current;

a plate coupled to the magnetic vibrator to transmit the vibration to a fluid including a particulate matter; and a vibration adjustment circuit configured to, in a first mode, adjust the vibration based on setting information inputted through a user interface and including an amplitude and a frequency, and in a second mode, to adjust the vibration based on the setting information and an external sound source including an amplitude and a frequency.

According to an embodiment, the vibration adjustment circuit may include:

a sound source processor configured to extract sound source information from the external sound source; and a vibration adjuster configured to adjust the vibration by generating a control signal of the first mode for adjusting the vibration of the magnetic vibrator according to the amplitude and the frequency of the setting information, and by generating a control signal of the second mode for adjusting the vibration of the magnetic vibrator according to the amplitude and the frequency included in each of the setting information and the sound source information.

According to an embodiment, the current support may be extended in one direction, and the magnetic vibrator may be configured to generate the magnetic field in a direction of crossing over the current support.

According to an embodiment, the first mode may be a mode for adjusting the vibration only based on the setting information inputted through the user interface and including the amplitude and the frequency.

According to an embodiment, the alternating current may be applied in a tangential direction of an outer peripheral portion of the current support.

According to an embodiment, one end of the current support may be accommodated in the magnetic vibrator, and the magnetic vibrator may be vibrated in a longitudinal direction of the current support due to the change in the polarity of the alternating current.

According to an embodiment, the vibration adjustment circuit may further include a memory configured to store the external sound source.

According to an embodiment, each of the setting information and the sound source information may include an amplitude and a frequency, and the vibration adjuster may be configured to generate the control signal in the second mode, such that an amplitude of the vibration of the magnetic vibrator is a sum of the amplitude included in the setting information and the amplitude included in the sound source information.

According to an embodiment, each of the setting information and the sound source information may include an amplitude and a frequency, and the vibration adjuster may be configured to generate the control signal in the second mode, such that a frequency of the vibration of the magnetic vibrator is a sum of the frequency included in the setting information and the frequency included in the sound source information.

Advantageous Effect

When the cold brew coffee extraction device for adjusting the sonic vibration based on the sound signal according to an embodiment of the present disclosure is installed and implemented for commercial purpose, cold brew coffee may be extracted based on setting information and an external sound source selected by a purchaser of coffee.

In addition, the cold brew coffee extraction device for adjusting the sonic vibration based on the sound signal according to an embodiment of the present disclosure is implemented at the same time as playing back the external sound source selected by the purchaser of coffee, such that the purchaser of coffee can enjoy a coffee culture enhanced from the aspects of time and emotion.

BRIEF DESCRIPTION OF THE DRAWINGS

A brief description of drawings is provided for easy understanding of drawings recited in the detailed description of the present disclosure, in which:

FIGS. 1A and 1B are views illustrating an exterior of a cold brew coffee extraction device which adjusts a sonic vibration based on a sound signal according to an embodiment of the present disclosure, wherein

| Explanation of reference numbers | |
| --- | --- |
| 1: cold brew coffee extraction device | 10: main body |
| 30: plate | 50: display |
| 70: user interface | |

DETAILED DESCRIPTION

Various changes can be made to the present disclosure and various embodiments may be provided, and specific embodiments will be described in detail through the drawings and the detailed descriptions. However, various exemplary embodiments of the present disclosure are not limited to the specific embodiments, and should be construed as including modification, equivalent and/or alternative of exemplary embodiments of the present disclosure.

In the description of the present disclosure, certain detailed explanations of related art are omitted when it is deemed that they may unnecessarily obscure the essence of the present disclosure. In addition, numbers used in the detailed description of the present disclosure (for example, first, second, or the like) are merely identification sings for distinguishing one element from another element.

In addition, it will be understood that when an element is "coupled with" or "connected with" another element, the element may be directly coupled or directly connected with another element, and there may be an intervening element between the element and another element unless the context clearly indicates otherwise.

The term "module" and the terms having suffix "-er" or "-or" used for elements in the following description are given or interchangeably used only considering easiness of writing of the specification, and do not have meanings or roles distinguishing from one another. In addition, portions having nothing to do with the description of the present disclosure are omitted from the drawings to clearly describe the present disclosure, and widths, lengths, or thickness of elements in the drawings may be exaggerated for convenience of explanation. Throughout the specification, same reference numerals are used for the same elements.

Hereinafter, embodiments of the present disclosure will be described in detail with reference to the accompanying drawings.

Figure 1A:
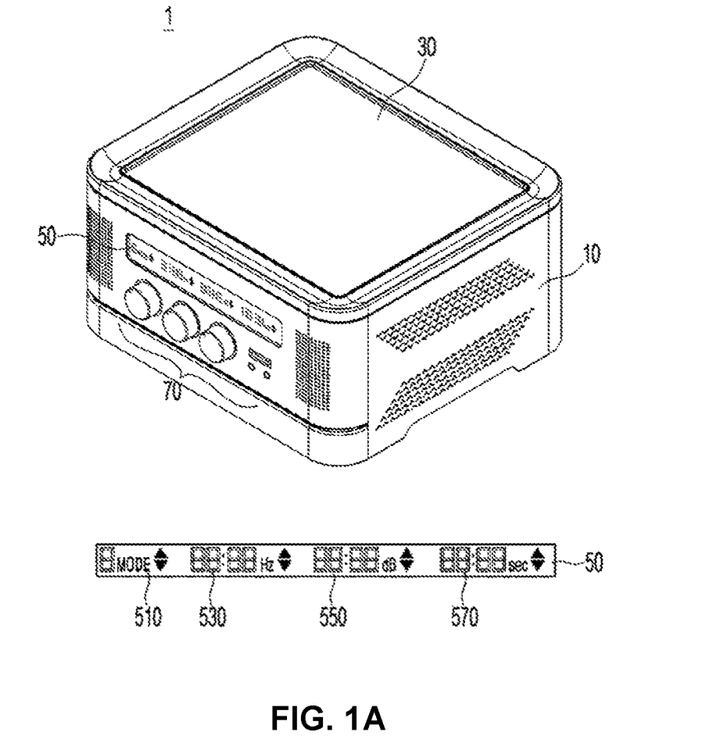
FIG. 1A is a perspective view of the cold brew coffee extraction device according to an embodiment of the present disclosure.
Figure 1B:
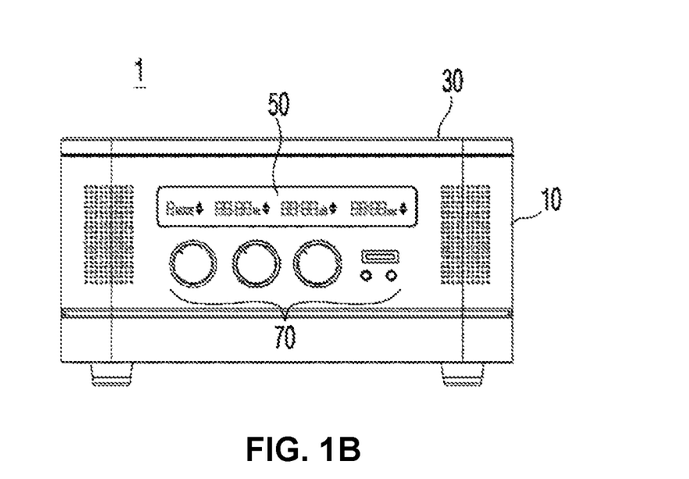
FIG. 1B is a front view of the cold brew coffee extraction device according to an embodiment of the present disclosure.

FIGS. 1A and 1B are views illustrating an exterior of a cold brew coffee extraction device for adjusting a sonic vibration based on a sound signal according to an embodiment of the present disclosure. More specifically, FIG. 1A is a perspective view of the cold brew coffee extraction device according to an embodiment of the present disclosure, and FIG. 1B is a front view of the cold brew coffee extraction device according to an embodiment of the present disclosure.

Referring to FIGS. 1A and 1B, the cold brew coffee extraction device 1 may extract cold brew coffee in a short time by applying a vibration to a vessel containing a coffee aqueous solution. To achieve this, the cold brew coffee extraction device 1 may include a main body 10 and a plate 30, and the main body 10 may further include a display 50 and a user interface 70.

In the present specification, it is assumed that the plate 30 is disposed on an upper surface of the main body 10, and the display 50 and the user interface 70 are disposed on a front surface of the main body 10, but the scope of the present disclosure is not limited thereto. According to an embodiment, the main body 10 and the plate 30 may be spaced apart from each other, and the display 50 and the user interface 70 may also be spaced apart from the main body 10. In this case, the display 50 and the user interface 70 may remotely communicate with the main body 10 to exchange information with each other.

The main body 10 may generate a vibration by using elements included therein, and may transmit the generated vibration to the plate 30, such that the plate 30 applies a sonic vibration to the vessel placed on the upper surface thereof.

A vessel that can contain a fluid may be placed on the upper surface of the plate 30. The vessel is a vessel that contains a fluid including a particular matter, and according to an embodiment, the vessel may contain a coffee aqueous solution in which ground coffee and water are mixed.

The main body 10 transmits the generated vibration to the plate 30, thereby applying a sonic vibration to the vessel, and accordingly, the ground coffee easily dissolves in the water, and time required to extract cold brew coffee can be greatly reduced.

The main body 10 may further include various elements to generate a vibration. This will be described in detail below with reference to FIGS. 2A and 2B.

Figure 2A:
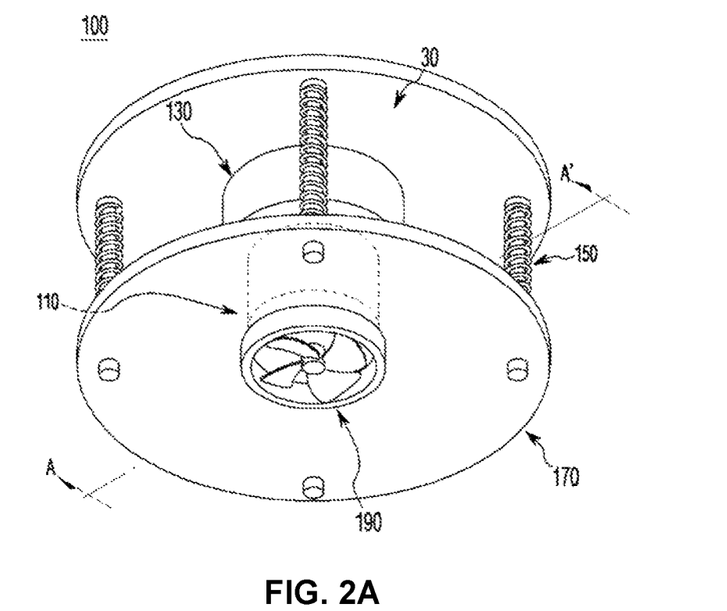
FIG. 2A is a view illustrating main elements included in a main body illustrated in FIG. 1, including a plate, in detail.
Figure 2B:
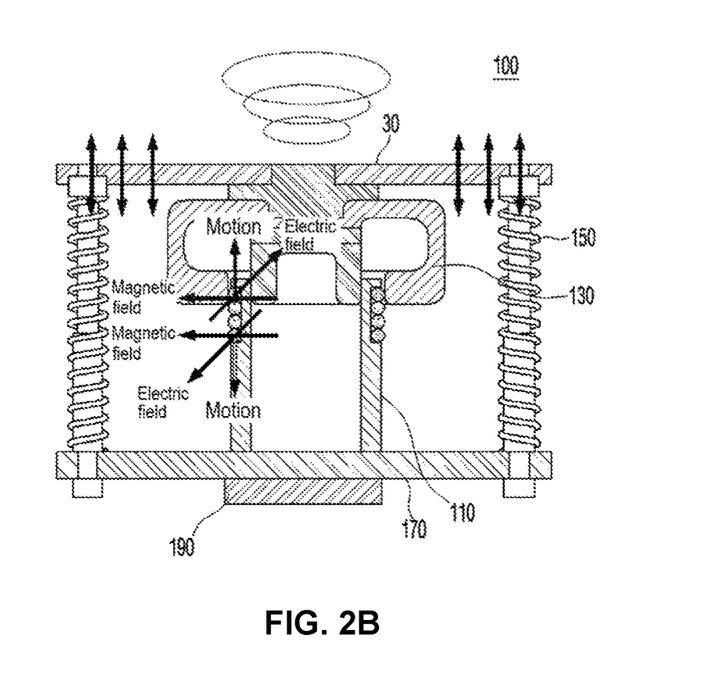
FIG. 2B is a cross sectional view taken along line A-A' of FIG. 2A.

FIG. 2A is a view illustrating main elements included in the main body of FIG. 1, including the plate, in detail. FIG. 2B is a cross sectional view taken along line A-A' of FIG. 2A.

The main body 10 may include a current support 110, a magnetic vibrator 130, a guide portion 150, and a base 170. According to an embodiment, the main body 10 may further include a cooler 190.

The current support 110 may receive an alternating current and may generate an electric field. The magnetic vibrator 130 may generate a magnetic field in the same region as that of the electric field, and may vibrate according to a change in the intensity of the electric field.

The current support 110 may include a bobbin and a voice coil wound around the bobbin to generate the electric field.

The magnetic vibrator 130 may include a magnet and a panel to generate the magnetic field. The magnet may be implemented by using a permanent magnet, and the panel may be implemented by using a magnetic substance.

The guide portion 150 may be disposed in contact with the plate 130 and the base 170 therebetween, and may guide vertical movements of the plate 30 and the base 170.

The guide portion 150 may include a shaft, a linear bushing bearing, an elastic spring, and a buffering member to guide the vertical movements of the plate 30 and the base 170.

The base 170 may rapidly discharge heat generated in the current support 110 and the magnetic vibrator 130 to the outside, in cooperation with the cooler 190 included therein. The base 170 may be formed by a material having a high thermal conductivity to rapidly discharge the heat.

Referring back to FIG. 1, the display 50 may display information related to the vibration generated in the main body 10. According to an embodiment, the display 50 may display an operation mode 510 of the main body 10, a frequency 530 of the vibration, an intensity 550, and a vibration time 570. However, the scope of the present disclosure is not limited thereto. According to another embodiment, the display 50 may display information related to the sonic vibration that the plate 30 applies to the vessel placed on the upper surface thereof.

The user interface 70 may receive an input of information necessary for generating the vibration in the main body 10 from the outside, and may transmit the inputted information to the main body 10.

The plate 30 may transmit the vibration generated by the main body 10 to the vessel placed on the upper surface thereof.

The main body 10 may control the electric field generated by the current support 110 by controlling the alternating current inputted to the current support 110, and furthermore, may adjust the vibration of the magnetic vibrator 130 which vibrates according to a change in the intensity of the electric field.

More specifically, the current support 110 may be extended in one direction, and the main body 10 may allow the alternating current to be applied in a tangential direction of an outer peripheral portion of the current support 110. The magnetic vibrator 130 may accommodate one end of the current support 110 therein, and may generate the magnetic field in a direction of crossing over the current support 110, and thus may vibrate in a longitudinal direction of the current support 110 due to a change in the polarity of the alternating current. The main body 10 may further include a vibration adjustment circuit to adjust the vibration of the magnetic vibrator 130.

Figure 3:
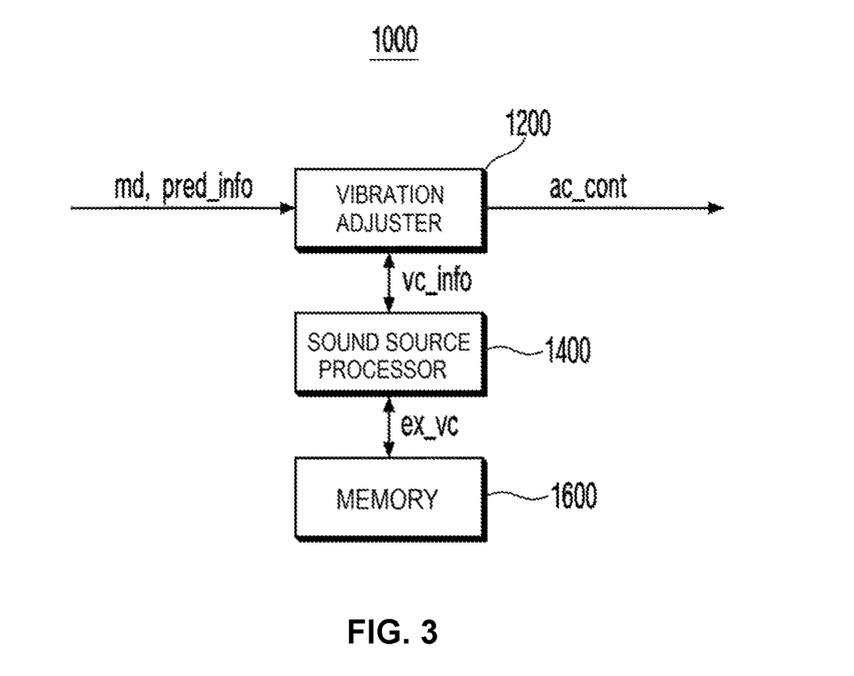
FIG. 3 is a block diagram of a vibration adjustment circuit for adjusting a vibration of a magnetic vibrator, as an element included in the main body.

Herein, adjustment of the vibration of the magnetic vibrator 130 will be described in detail with reference to FIG. 3. FIG. 3 is a block diagram of the vibration adjustment circuit for adjusting the vibration of the magnetic vibrator, as an element included in the main body.

The vibration adjustment circuit 1000 may include a vibration adjuster 1200, a sound source processor 1400, and a memory 1600.

The vibration adjuster 1200 may generate a control signal ac_cont for adjusting the vibration of the magnetic vibrator 130.

The vibration adjuster 1200 may generate the control signal ac_cont according to an operation mode md (hereinafter, referred to as an "operation mode") of the main body 10. The operation mode md may be inputted through the user interface 70.

The vibration adjuster 1200 may receive an input of setting information pred_info from the user interface 70, in addition to the operation mode md, and may further receive an input of sound source information vc_info from the sound source processor 1400. The sound source information vc_info may be information that is extracted from a sound signal ex_vc in various forms (hereinafter, referred to as an "external sound source") stored in the memory 1600 by the sound source processor 1400.

According to an embodiment, the vibration adjuster 1200 may generate the control signal ac_cont by using the operation mode md, the setting information pred_info, and the sound source information vc_info, and may adjust the vibration of the magnetic vibrator 130 through the generated control signal ac_cont. Herein, the control signal ac_cont may be a signal for controlling the alternating current inputted to the current support 110.

Figure 4A:
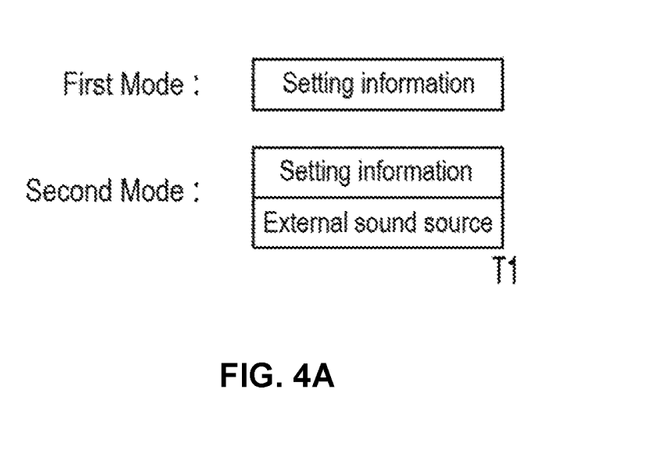
FIGS. 4A, 4B and 4C are views to illustrate operation modes of the main body.
Figure 4B:
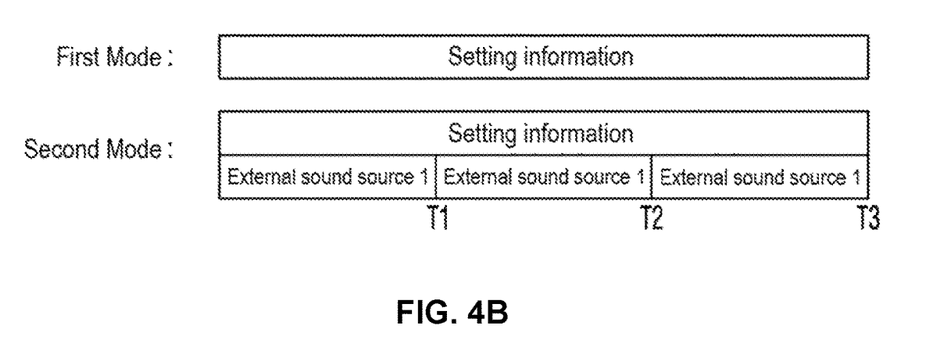
Figure 4C:
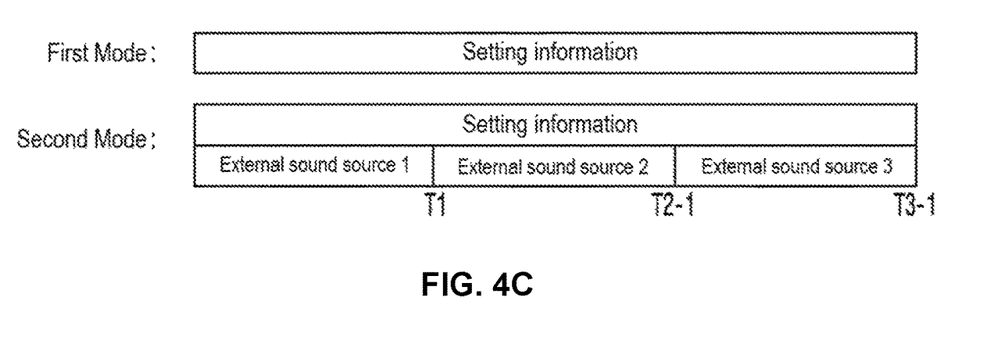

Herein, a process of adjusting, by the vibration adjuster 1200, the vibration of the magnetic vibrator 130 according to the operation mode md will be described in more detail with reference to FIGS. 4A, 4B and 4C. FIGS. 4A, 4B and 4C are views to illustrate operation modes of the main body.

According to an embodiment, the main body 10 may operate in a plurality of operations modes (two or more operation modes). In the present specification, it is assumed that the main body 10 operates in a first mode and a second mode for convenience of explanation. In addition, it is assumed that, in the first mode, the vibration adjuster 1200 adjusts the vibration of the magnetic vibrator 130 only based on the setting information pred_info inputted through the user interface 70, and in the second mode, the vibration adjuster 1200 adjusts the vibration based on the setting information pred_info and the external sound source ex_vc. However, the scope of the present disclosure is not limited thereto.

In FIGS. 4A, 4B and 4C, in the first mode, the vibration adjuster 1200 may operate for a predetermined time (that is, in the case of FIG. 4A, time t1; in the case of FIG. 4B, time T3; or in the case of FIG. 4C, time T3-1), only based on the setting information pred_info. According to an embodiment, the predetermined time may be set to a time ranging from 3 minutes to 30 minutes, but the scope of the present disclosure is not limited thereto.

In FIGS. 4A, 4B, and 4C, in the second mode, the vibration adjuster 1200 may operate for a predetermined time (that is, in the case of FIG. 4A, time T1; in the case of FIG. 4B, time T3; or in the case of FIG. 4C, time T3-1), based on the setting information pred_info and the external sound source ex_vc.

When the predetermined time in the second mode is longer than a playback time of the external sound source ex_vc, the vibration adjuster 1200 may operate based on a plurality of external sound sources. In this case, according to an embodiment, the vibration adjuster 1200 may operate based on the same external sound source (that is, "external sound source" in the case of FIG. 4A; or "external sound source 1" in the case of FIG. 4B). In addition, according to another embodiment, the vibration adjuster 1200 may operate based on different external sound sources (that is, "external sound source 1," "external sound source 2,", and "external sound source 3" in the case of FIG. 4C).

Figure 5A:
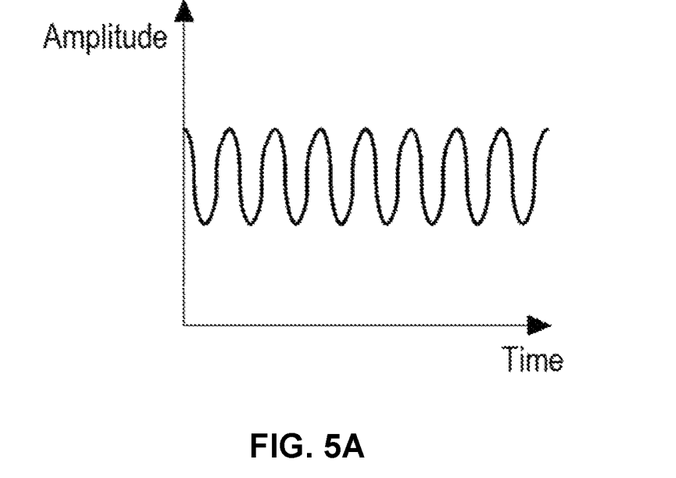
FIGS. 5A and 5B are views illustrating setting information.
Figure 5B:
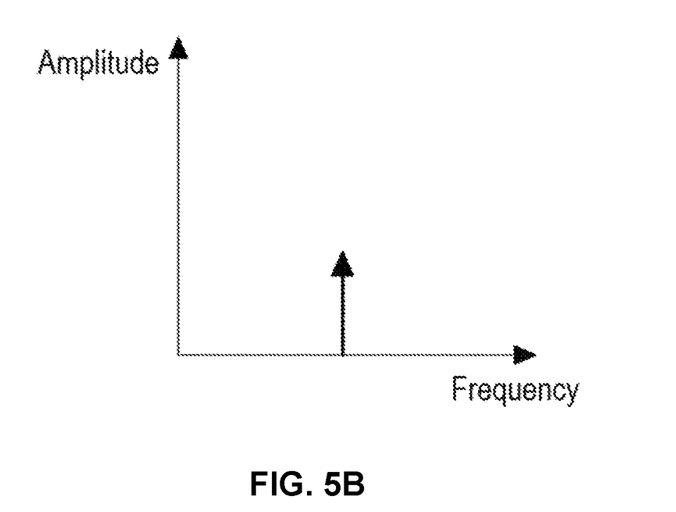
Figure 5C:
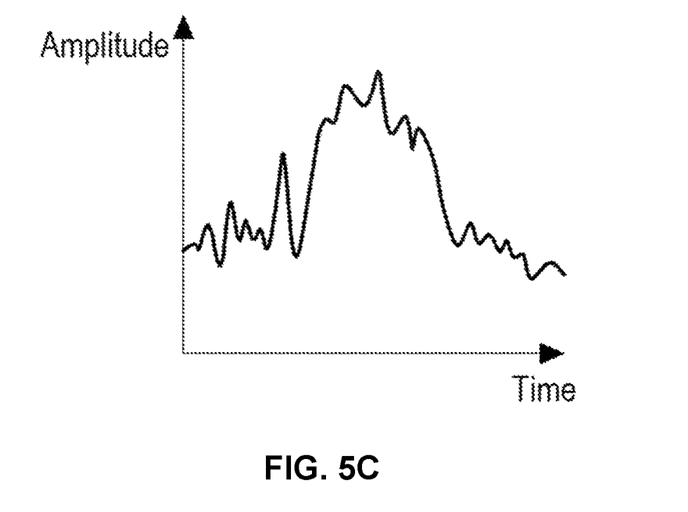
FIGS. 5C and 5D are views illustrating sound source information.
Figure 5D:
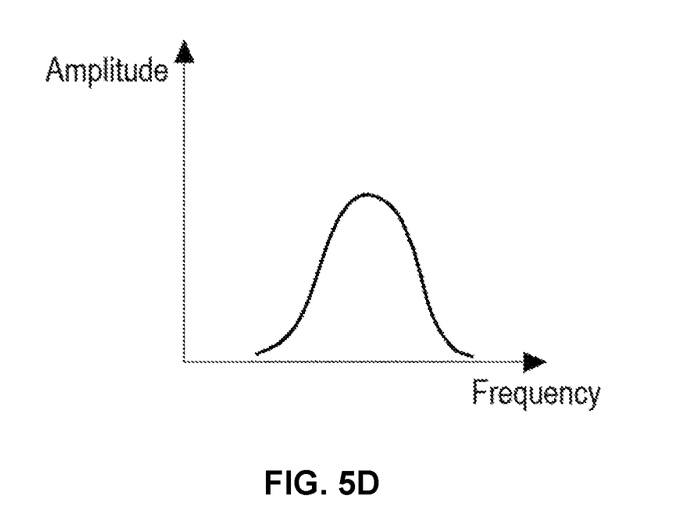

Herein, a process of the vibration adjuster 1200 operating based on the setting information pred_info and/or external sound source ex_vc will be described with reference to FIGS. 5A, 5B, 5C and 5D. FIGS. 5A and 5B are views illustrating setting information pred_info, and FIGS. 5C and 5D are views illustrating sound source information ex_vc.

Herein, each of the setting information pred_info and the sound source information vc_info may include an amplitude and a frequency, and the sound source information vc_info may be information that is extracted from the external sound source ex_vc stored in the memory 1600 by the sound source processor 1400. According to an embodiment, to extract the amplitude and the frequency from the external sound source ex_vc, a predetermined frequency band may be selected, but the scope of the present disclosure is not limited thereto.

In the first mode, the vibration adjuster 1200 may generate the control signal ac_cont according to the amplitude and the frequency included in the setting information pred_info.

In the second mode, the vibration adjuster 1200 may generate the control signal ac_cont according to the amplitude and the frequency included in each of the setting information and the sound source information vc_info.

According to an embodiment, in the second mode, the vibration adjuster 1200 may generate the control signal ac_cont, such that the amplitude of the vibration of the magnetic vibrator 130 is a sum of the amplitude included in the setting information pred_info (that is, FIG. 5A), and the amplitude of the sound source information vc_info (that is, FIG. 5C). However, the scope of the present disclosure is not limited thereto.

According to an embodiment, in the second mode, the vibration adjuster 1200 may generate the control signal ac_cont, such that the frequency of the vibration of the magnetic vibrator 130 is a sum of the frequency included in the setting information pred_info (that is, FIG. 5B), and the frequency of the sound source vc_info (that is, FIG. 5D). However, the scope of the present disclosure is not limited thereto.

That is, the main body 10 may operate in the plurality of operation modes, and according to an embodiment, when the main body 10 operates in the second mode, the main body 10 may vibrate the magnetic vibrator 130 based on the external sound source ex_vc, in addition to the setting information pred_info.

Accordingly, when the cold brew coffee extraction device for adjusting the sonic vibration based on the sound signal according to an embodiment of the present disclosure is installed and implemented for commercial purpose, the cold brew coffee extraction device may extract cold brew coffee based on the setting information pred_info and the external sound source ex_vc selected by a purchaser of coffee.

In addition, the cold brew coffee extraction device for adjusting the sonic vibration based on the sound signal according to an embodiment of the present disclosure is implemented at the same time as playing back the external sound source ex_vc selected by the purchaser of coffee, such that the purchaser of coffee can enjoy a coffee culture enhanced from the aspects of time and emotion.

The detailed descriptions above are merely examples of descriptions of the technical idea of the present disclosure, and it will be understood by a person skilled in the art that various modifications or change can be made based on the descriptions of the present disclosure without departing from the essence of the present disclosure.

Therefore, embodiments disclosed the present disclosure are not intended to limit the technical idea of the present disclosure, and are provided to describe the present disclosure, and the scope of the technical idea of the present disclosure is not limited by these embodiments.

The scope of the present disclosure should be interpreted based on the appended claims, and all technical ideas within the same scope will be construed as being included in the scope of the present disclosure.

What is claimed is:

1. A cold brew coffee extraction device for adjusting a sonic vibration based on a sound signal, the cold brew coffee extraction device comprising:
   a current support configured to generate an electric field;
   a magnetic vibrator configured to generate a magnetic field, and to be vibrated by the electric field generated by the current support due to a change in a polarity of an alternating current;
   a plate coupled to the magnetic vibrator to transmit the vibration to a fluid comprising a particulate matter; and
   a vibration adjustment circuit configured to, in a first mode, adjust the vibration based on setting information inputted through a user interface and comprising an amplitude and a frequency, and in a second mode, to adjust the vibration based on the setting information and an external sound source comprising an amplitude and a frequency,
   wherein the vibration adjustment circuit comprises:
   a sound source processor configured to extract sound source information from the external sound source; and
   a vibration adjuster configured to adjust the vibration by generating a control signal of the first mode for adjusting the vibration of the magnetic vibrator according to the amplitude and the frequency of the setting information, and by generating a control signal of the second mode for adjusting the vibration of the magnetic vibrator according to the amplitude and the frequency included in each of the setting information and the sound source information.

2. The cold brew coffee extraction device of claim 1, wherein the current support is extended in one direction, and the magnetic vibrator is configured to generate the magnetic field in a direction of crossing over the current support.

3. The cold brew coffee extraction device of claim 1, wherein the first mode is a mode for adjusting the vibration only based on the setting information inputted through the user interface and comprising the amplitude and the frequency.

4. The cold brew coffee extraction device of claim 2, wherein the alternating current is applied in a tangential direction of an outer peripheral portion of the current support.

5. The cold brew coffee extraction device of claim 2, wherein one end of the current support is accommodated in the magnetic vibrator, and the magnetic vibrator is vibrated in a longitudinal direction of the current support due to the change in the polarity of the alternating current.

6. The cold brew coffee extraction device of claim 2, wherein the vibration adjustment circuit further comprises a memory configured to store the external sound source.

7. The cold brew coffee extraction device of claim 3, wherein the vibration adjustment circuit further comprises a memory configured to store the external sound source.

8. The cold brew coffee extraction device of claim 2, wherein each of the setting information and the sound source information comprises an amplitude and a frequency, and wherein the vibration adjuster is configured to generate the control signal in the second mode, such that an amplitude of the vibration of the magnetic vibrator is a sum of the amplitude included in the setting information and the amplitude included in the sound source information.

9. The cold brew coffee extraction device of claim 3, wherein each of the setting information and the sound source information comprises an amplitude and a frequency, and wherein the vibration adjuster is configured to generate the control signal in the second mode, such that an amplitude of the vibration of the magnetic vibrator is a sum of the amplitude included in the setting information and the amplitude included in the sound source information.

10. The cold brew coffee extraction device of claim 2, wherein each of the setting information and the sound source information comprises an amplitude and a frequency, and wherein the vibration adjuster is configured to generate the control signal in the second mode, such that a frequency of the vibration of the magnetic vibrator is a sum of the frequency included in the setting information and the frequency included in the sound source information.

11. The cold brew coffee extraction device of claim 3, wherein each of the setting information and the sound source information comprises an amplitude and a frequency, and wherein the vibration adjuster is configured to generate the control signal in the second mode, such that a frequency of the vibration of the magnetic vibrator is a sum of the frequency included in the setting information and the frequency included in the sound source information.

* * * * *